United States Patent
Barr

(10) Patent No.: US 10,093,278 B2
(45) Date of Patent: Oct. 9, 2018

(54) VEHICLE WINDOW CLEANING APPARATUS

(71) Applicant: FORD GLOBAL TECHNOLOGIES, LLC, Dearborn, MI (US)

(72) Inventor: William Gerald Barr, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 15/071,777

(22) Filed: Mar. 16, 2016

(65) Prior Publication Data
US 2016/0272159 A1  Sep. 22, 2016

(30) Foreign Application Priority Data

Mar. 18, 2015  (GB) .................................... 1504595.8

(51) Int. Cl.
| | | |
|---|---|---|
| *B08B 3/00* | (2006.01) | |
| *B60S 1/38* | (2006.01) | |
| *B60S 1/02* | (2006.01) | |
| *B08B 7/04* | (2006.01) | |
| *B60S 1/08* | (2006.01) | |

(52) U.S. Cl.
CPC ........ *B60S 1/38* (2013.01); *B08B 7/04* (2013.01); *B60S 1/02* (2013.01); *B60S 1/0818* (2013.01); *B60S 2001/3837* (2013.01)

(58) Field of Classification Search
None
See application file for complete search history.

(56) References Cited

U.S. PATENT DOCUMENTS

| | | | | |
|---|---|---|---|---|
| 1,563,328 | A * | 12/1925 | Bradbury ................ | F16N 13/10 417/392 |
| 3,371,368 | A | 3/1968 | Walker | |
| 3,716,886 | A | 2/1973 | Klomp | |
| 5,383,247 | A | 1/1995 | Nickel | |
| 6,470,527 | B1 | 10/2002 | Boncoglu | |
| 2003/0208873 | A1 | 11/2003 | Chang | |
| 2008/0053101 | A1 * | 3/2008 | Schwarz ................ | B64D 33/02 60/772 |
| 2012/0211426 | A1 * | 8/2012 | Santoro ................ | B01F 5/0473 210/665 |

FOREIGN PATENT DOCUMENTS

| | | |
|---|---|---|
| BE | 1013204 A6 | 10/2001 |
| DE | 19919048 A1 | 11/2000 |
| EP | 2626257 A2 | 8/2013 |
| EP | 2626257 A3 | 10/2013 |
| FR | 2888551 A1 | 1/2007 |

OTHER PUBLICATIONS

English Machine Translation of BE1013204A6.
English Machine Translation of DE19919048A1.
English Machine Translation of FR2888551A1.

* cited by examiner

*Primary Examiner* — Eric Wayne Golightly
(74) *Attorney, Agent, or Firm* — Jason Rogers; King & Schickli, PLLC

(57) ABSTRACT

Apparatus for cleaning a window of a vehicle is provided. The apparatus includes: a fluid extraction opening provided on the vehicle in proximity to the window of the vehicle; a suction pump mounted in the vehicle; and a fluid tight conduit extending between the fluid extraction opening and the suction pump.

10 Claims, 3 Drawing Sheets

VEHICLE WINDOW CLEANING APPARATUS

TECHNICAL FIELD

The present disclosure relates to an apparatus for actively drawing fluid from a window of a vehicle.

BACKGROUND

Windscreen wipers are an essential component of a vehicle for ensuring the driver has unimpaired vision in all conditions. Windscreen wipers typically comprise rigid arms which sweep back and forth across the windscreen or tailgate glass. The rigid arms are typically configured to support wiper blades which comprise a rubber wiper portion held in contact with the glass of the windscreen or tailgate as the wiper arm sweeps across.

In wet conditions, wiper blades scrape any water which has settled on the windscreen or tailgate glass to the edge of the glass where it can drain away and does not obstruct the vision of the driver.

In dry weather, windscreen wipers allow the windscreen to be cleaned of dirt and grease by firstly spraying water onto the windscreen or tailgate glass, then operating the wipers to wipe away the water together with any dirt and grease which has become suspended in the water.

Even the best conventional wiper blades leave droplets of water on the windscreen or tailgate glass when operating. This may be particularly apparent when the windscreen or tailgate glass is especially dirty or greasy. Over time the performance of the wiper blades deteriorates, as the material of the blade is degraded by dirt, oil, sunlight, ozone and airborne contaminants. When performance of the blade is reduced, the blade does not maintain contact with the glass across the full length of the blade during its full traverse over the windscreen or tailgate glass. Water droplets may therefore remain on the windscreen and may impair the vision of the driver.

SUMMARY

According to an aspect of the present disclosure, there is provided an apparatus for cleaning a window of a vehicle, such as a motor vehicle. The apparatus comprises: a fluid extraction opening provided in the vehicle in proximity to the window of the vehicle; a suction pump mounted on the vehicle; and a fluid tight conduit extending between the fluid extraction opening and the suction pump.

The term 'window of a vehicle' in this specification is intended to encompass any surface of a vehicle and in particular a windscreen, rear screen, tailgate window, side windows, sun roof, mirrors, light lenses or any transparent, translucent or reflective surface of the vehicle.

The term 'suction pump' in this specification is intended to encompass a simple venturi, a venturi pump or any other form of pump such as a piston, rotary or peristaltic pump.

The suction pump may be air powered, e.g. the suction pump may be powered by a supply of pressurised air. The suction pump may comprise a venturi duct through which air flows; and wherein the outlet of the fluid tight conduit is in fluidic communication with the flow of air at a throat of the venturi duct. The suction pump may comprise a first piston configured to be acted upon by pressurised air and a second piston configured to act upon the flow within the fluid tight conduit; wherein the first and second pistons are mechanically coupled.

The air may be ram air provided by a ram air source of the vehicle. The air may be bled from a ram air system configured to provide ram air to another system of the vehicle. For example, the air may be bled from an enhanced induction system for an engine of the vehicle.

The fluid extraction opening may be provided on a wiper blade. The wiper blade may be mounted on the vehicle and may engage the window.

The apparatus may further comprise a controller, wherein the controller comprises one or more modules configured to determine whether the ram air source is demanded by another system of the vehicle. If the ram air source is demanded by another system of the vehicle, the controller may prevent or delay operation of the suction pump.

According to another aspect of the disclosure, there is provided a controller for use in the apparatus according to any of the above-mentioned aspects of the disclosure.

According to another aspect of the disclosure, there is provided a method for removing water from a window of a vehicle. The method comprises: providing a fluid extraction opening in proximity to the window of the vehicle; providing a suction pump; and providing a fluid tight conduit between the fluid extraction opening and the suction pump.

The suction pump may be air powered. The method may further comprise supplying pressurised air to the suction pump.

The pressurised air may be ram air from a ram air source of the vehicle. The pressurised air may be bled from a ram air system configured to provide ram air to another system of the vehicle. For example, the pressurised air may be bled from an enhanced induction system for an engine of the vehicle.

The method may further comprise determining whether the ram air source is demanded by another system of the vehicle. If the ram air source is demanded by another system of the vehicle, operation of the suction pump may be prevented or delayed.

The method may further comprise monitoring the presence of water and/or dirt on the vehicle window, and adjusting the operation of the suction pump accordingly. For example by extending or reducing the period over which the suction pump is operating if more or less water and/or dirt is present.

According to another aspect of the disclosure, there is provided a vehicle comprising the apparatus according to any of the above mentioned aspects of the disclosure.

According to another aspect of the disclosure, there is provided an apparatus for cleaning a surface of a vehicle, for example, a window, a lens of a light of the vehicle or a mirror, such as a wing mirror. The apparatus comprises: a fluid extraction opening provided on the vehicle in proximity to the surface; a suction pump mounted on the vehicle; and a fluid tight conduit extending between the fluid extraction opening and the suction pump.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWING FIGURES

For a better understanding of the present disclosure, and to show more clearly how it may be carried into effect, reference will now be made, by way of example, to the accompanying drawings, in which.

DETAILED DESCRIPTION

Figure 1:
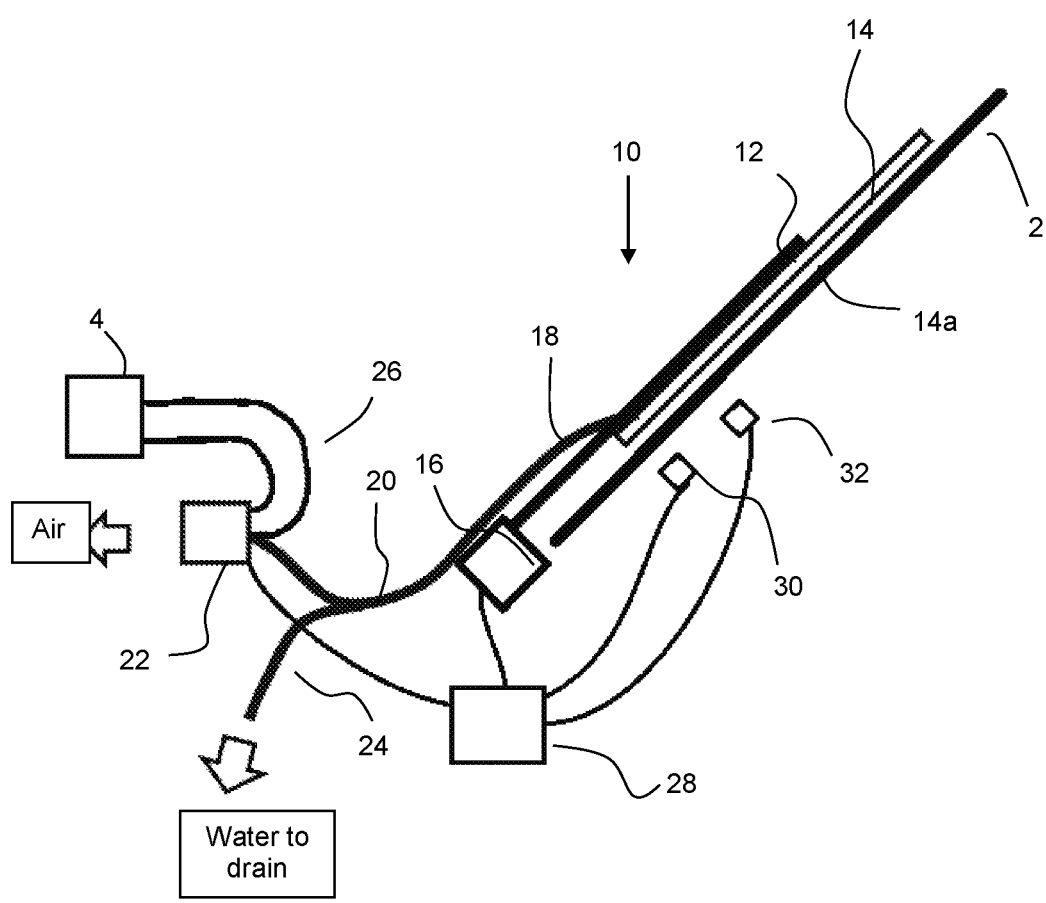
FIG. 1 is a schematic sectional view of a vehicle wiper assembly according to an example of the present disclosure.

A vehicle, such as a motor vehicle, may comprise a windscreen 2 and a windscreen wiper assembly 10. With reference to FIG. 1, the vehicle wiper assembly 10, according to an example of the present disclosure, comprises a wiper arm 12 and a wiper blade 14. The wiper arm is configured to couple to the wiper blade 14 at a first end of the wiper arm 12.

Figure 2:
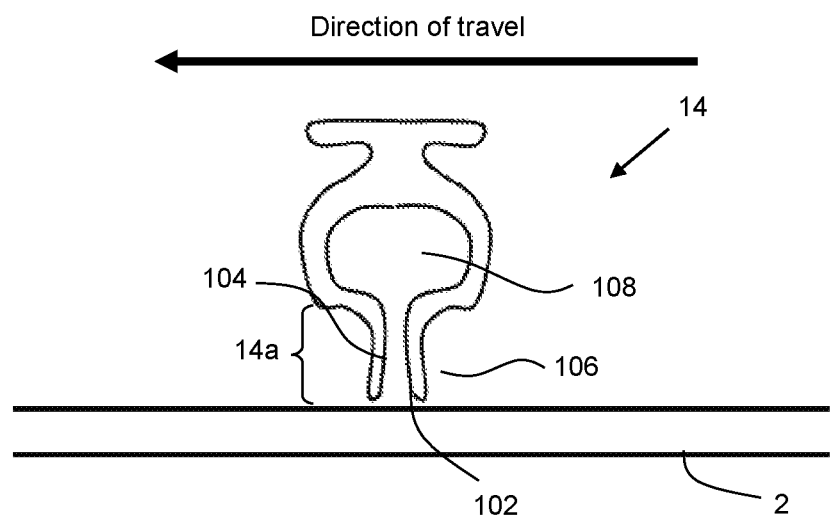
FIG. 2 is a schematic sectional view of a wiper blade for a wiper assembly of a vehicle according to an example of the present disclosure.

As illustrated in FIG. 2, the wiper blade 14 comprises a flexible wiper portion 14a. The wiper arm 12 and wiper blade 14 are together configured such that the wiper portion 14a maintains contact with the windscreen 2, as the wiper blade is passed across the windscreen 2.

In order to maintain contact between the wiper blade 14 and the windscreen 2, the wiper blade 14 may be pivotally connected to the wiper arm 12, and the wiper arm 12 may include a resilient element such as a spring (not show) which acts to hold the wiper arm 12 and the wiper blade 14 against the windscreen. The wiper blade 14 itself may be resilient or may comprise one or more resilient elements (not shown) which act to curve the wiper portion 14a of the wiper blade 14 in order to adapt it to the shape of the windscreen 2, and thereby maintain contact between the wiper portion 14a and the windscreen 2 across the full length of the wiper blade.

The wiper assembly 10 of FIG. 1 further comprises a wiper motor and actuator assembly 16, which is coupled to a second end of the wiper arm 12. The wiper motor and actuator assembly 16 is operable to control the movement of the wiper arm 12 to sweep the wiper blade 14 across the windscreen 2.

As the wiper blade 14 is moved across the windscreen 2, the wiper portion 14a scrapes across the surface of the windscreen sweeping any water or dirt present on the windscreen toward the sides of the windscreen. Additionally, water may collect on the wiper portion 14a as it moves across the windscreen 2 and may run down the wiper blade 14 to the bottom of the windscreen. In this way the wiper assembly 10 acts to maintain good visibility for a driver of the vehicle.

The driver may operate the windscreen wipers during bad weather for the removal of precipitation such as rain water from the windscreen 2. The driver may also use the windscreen wipers together with a windscreen washer (not shown) which introduces water or a cleaning solution onto the windscreen, allowing dirt to be loosened by the windscreen wipers and carried away with the water.

As the wiper blade 14 moves across the windscreen 2, some of the water which has settled on the windscreen 2 may not be collected by the wiper blade 14. The wiper blade may sweep over the water without it being scraped to the side of the windscreen. This may be especially likely if the windscreen is dirty or greasy, or if the material of the windscreen wiper blade has begun to deteriorate. If the windscreen wipers are affected by this, water droplets and dirt may remain on the surface of the windscreen and the vision of the driver may be impaired.

Even when the wiper blades are operating with optimal performance, it is still possible that some small water droplets will be left on the windscreen.

With reference to FIG. 2, the wiper blade 14, according to an example of the present disclosure, is provided with one or more openings 102. The one or more openings 102 are provided on the wiper portion 14a of the wiper blade 14.

On the wiper blade depicted in FIG. 2, the one or more openings 102 comprise a single elongated slot which extends substantially along the full length of the wiper blade 14. However, it is equally envisaged that the openings 102 could comprise a plurality of discrete openings along part or all of the length of the wiper blade 14.

In FIG. 2, the opening 102 is depicted on the edge of the wiper blade 14 which is in contact with the windscreen 2 and the opening is located between a leading surface 104 and a trailing surface 106 of the wiper portion 14a. Additionally or alternatively, the opening 102 may be provided on the leading surface 104 of the wiper blade 14. Again, additionally or alternatively the opening 102 may be provided on the trailing surface 106 of the wiper blade 14. The opening 102 may be positioned such that it is closest to any water on the windscreen 2 which has not been collected by the wiper blade as it sweeps across the windscreen.

One or more channels 108 are provided within the wiper blade 14. The opening 102 extends into the wiper blade 14 to meet the one or more channels 108. The opening 102 is thereby in fluidic communication with the one or more channels 108.

In the example shown in FIG. 2, the one or more channels 108 comprise a single channel with a substantially circular cross section which extends along the full length of the wiper blade 14. It is equally envisaged that the channel 108 may comprise a plurality of channels, and each of the channels may be connected in fluidic communication with a different subset of the openings 102. For example, the one or more channels 108 could comprise two channels, the first of which is connected to a subset of openings 102 provided on the leading surface 104 of the wiper blade 14 and the second of which is connected to a subset of the openings 102 provided on the trailing surface 106 of the wiper blade. Alternatively, the channels 108 may extend different lengths along the wiper blade 14 and may connect to different subsets of the openings 102 separated along the length of the wiper blade 14. Alternative configurations are also contemplated.

In another example, not shown, the leading surface 104, and/or trailing surface 106 may be discontinuous or comprise one or more recesses, crenulations or serrations, such that the leading and/or trailing surface does not contact the surface of the windscreen 2 continuously along its length. The serrations may comprise triangular shaped cut outs from the leading and/or trailing surface of the wiper portion 14a. Alternatively the cut outs may be circular, semi-circular, square or any other shape. The serrations may improve the flow of air, water, dirt and/or grease past the leading and/or trailing surfaces of the wiper portion 14a and may increase the amount of air, water, dirt and/or grease drawn through the one or more openings 102 and the one or more channels 108. The serrations may be substantially aligned with the one or more openings 102.

With reference to FIG. 1, the vehicle wiper assembly 10 further comprises a conduit 18. The conduit 18 is coupled to the wiper blade 14 and is in fluidic communication with at least one of the one or more channels 108 at a first end of the conduit 18. In the example shown in FIG. 1 the conduit 18 comprises a flexible tube, however the conduit 18 may alternatively comprise a rigid tube or pipe, or may comprise a bore formed through a body of the vehicle wiper assembly 10.

The conduit 18 is connected, at a second end, to a suction pump 22. The suction pump 22 is configured to pump air through the conduit 18, thereby pumping air through the openings 102 and through the channels 18 within the wiper blade 14.

In the wiper assembly 10 shown in FIG. 1, the suction pump 22 comprises a suction pump which is driven by pressurised air. As depicted in FIG. 1, the pressurised air is supplied by a ram air source 4. The ram air source may comprise a ram air duct provided on the vehicle. Ram air is supplied to the suction pump 22 via a ram air pipe 26. As depicted in FIG. 1, the suction pump 22 achieves a pumping effect by passing a flow of ram air over the outlet of the conduit 18. The ram air passing over the outlet of the conduit 18 is at a greater velocity than the air within the conduit 18. The static pressure of the ram air is therefore lower than the static pressure of the air within the conduit 18 and at the openings 102. A pressure difference is therefore created across the conduit 18 which acts to draw air through the conduit 18 from the openings 102 to the suction pump 22. The suction pump 22, as shown in FIG. 1, therefore comprises no moving components.

The ram air source 4 may also provide ram air to another system of the vehicle. For example, the ram air duct may be provided as part of an enhanced engine induction system which increases the static pressure within an intake manifold of an engine of the vehicle. Ram air may be bled off from the engine induction system to power the suction pump 22 when the wiper assembly 10 is operating.

Figure 3:
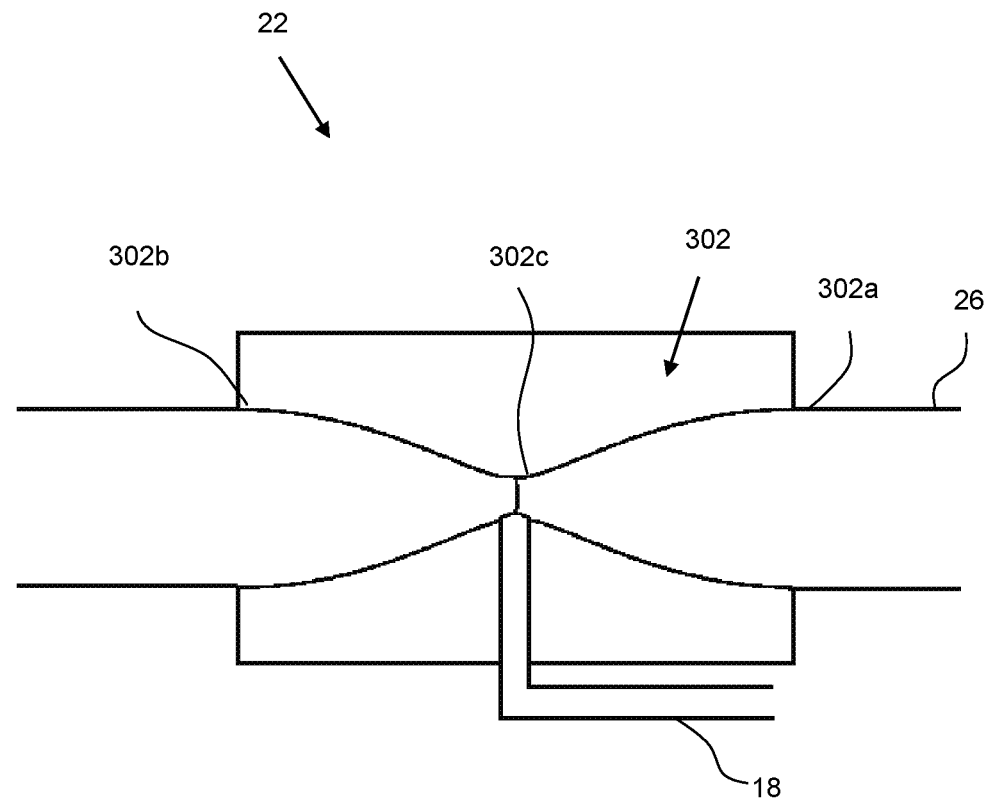
FIG. 3 is a schematic sectional view of a suction pump for a vehicle wiper assembly according to an example of the present disclosure.

In order to improve the performance of the suction pump 22, with reference to FIG. 3, the suction pump 22 may comprise a venturi duct 302. The venturi duct comprises an inlet end 302a and an outlet end 302b. The venturi also comprises a narrowing or throat 302c between the inlet and outlet ends 302a, 302b. The ram air pipe 26 is connected to the inlet end 302a of the venturi duct. The ram air flows through the venturi to the outlet end 302b. The outlet end 302b of the venturi duct may be open to atmosphere. At the throat 302c of the venturi duct, the velocity of the flow of ram air is increased due to the narrowing of the duct. The static pressure of the ram air is therefore reduced. As shown in FIG. 3, the conduit 18 is connected to the venturi duct 302 at the throat 302c, and is in fluidic communication with the flow of ram air through the venturi duct. Air is therefore drawn through the conduit 18 by virtue of the reduced pressure at the throat of the venturi 302. By providing the venturi 302 within the suction pump, the pressure of the ram air at the outlet of the conduit 18, i.e. at the throat 302c is lower compared to the pressure in the arrangement described with reference to FIG. 1. The increased pressure difference between the ends of the conduit 18 may lead to greater quantities of air being drawn through the conduit 18 which may lead to more effective removal of water, dirt and/or grease from the windscreen 2.

Figure 4:
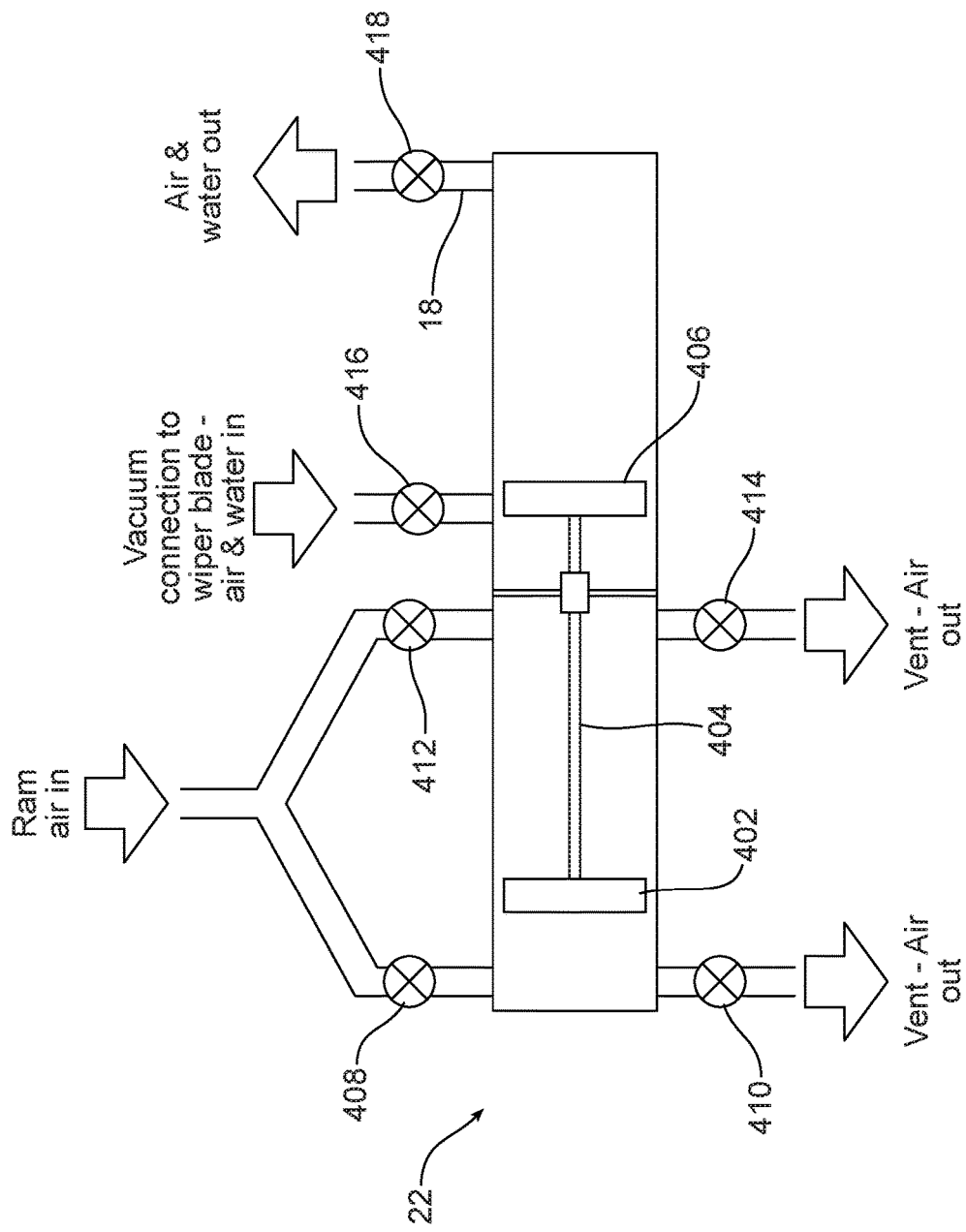
FIG. 4 is a schematic sectional view of an embodiment including a mechanical pump having first and second pistons.

In an alternative embodiment shown in FIG. 4, the supply of ram air is used to power a mechanical pump 22 which pumps air through the conduit 18. The mechanical pump 22 may comprise a first piston 402 which is acted upon by the ram air. The piston 402 may be mechanically coupled by connecting rod 404 to a second piston 406 which acts upon the flow within the conduit 18. An arrangement of valves 408, 410, 412, 414, such as unidirectional valves, may allow the flow of ram air to be directed to act upon each side of the first piston 402 in an alternating fashion, developing a reciprocating movement of the first and second pistons 402, 406. The valves 408, 410, 412, 414 may be electrically operated. Valves 416, 418, e.g. unidirectional valves, may be provided to ensure the flow within the conduit 18 is pumped in a uniform direction by the second piston 406. It is also envisaged that the suction pump 22 may comprise any other form of mechanical pump which can be driven by a supply of pressurised air.

Additionally or alternatively to being powered by ram air, the suction pump 22 may be powered by pressurised air supplied by a mechanical or electric pump. For example, an electric pump may be provided and may supply pressurised air to the suction pump 22 when the speed of the vehicle is too low for ram air to be provided by the ram air source 4. Additionally or alternatively, if the ram air source also provides ram air to another system of the vehicle, the electric pump may be used to power the suction pump 22 when ram air is required by the other system. Additionally or alternatively, the suction pump 22 may itself comprise a mechanically or electrically driven suction pump or any other suitable pump capable of directly pumping air through the conduit 18.

As described previously, during use of the wiper assembly 10, it is likely that water will be present on the windscreen, at or around the openings 102. Water is therefore entrained in the flow of air being pumped into the openings 102. Any dirt or grease suspended in the water is also drawn in through the openings 102.

The action of drawing water and dirt and/or grease into the openings 102 during operation of the wiper system 10 reduces the amount of water and/or dirt and/or grease which remains on the windscreen following an operation of the wiper assembly 10. The quality of vision that the driver has through the windscreen 2 is therefore improved relative to what it would have been with a conventional vehicle wiper assembly.

A water separator 20 may be provided within the vehicle wiper assembly 10. In the illustrated example, the water separator 20 is provided on the conduit 18 between its first and second ends, such that water and any suspended dirt and/or grease, which has been entrained in the flow of air through the conduit 18, can be separated from the flow before it reaches the suction pump 22.

A drain pipe 24 is provided in the wiper assembly 10 which carries any separated water, dirt and/or grease away from the water separator 20 to a fluid discharge outlet provided at a suitable drain point on the vehicle.

Although in the arrangement shown in FIG. 1, the water separator 20 is provided on the conduit 18 upstream of the suction pump 22, it is equally envisaged that the water separator may be provided downstream of the suction pump 22 and the suction pump may be configured to pump the mixture of air and water, dirt and/or grease. Alternatively, the suction pump 22 may comprise the water separator 20.

The wiper assembly 10 may further comprise a controller 28. The controller 28 may comprise one or more modules. In the illustrated example, the controller 28 is operatively connected to the wiper motor and actuator assembly 16 and the suction pump 22. In use, the controller 28 or one or more modules of the controller coordinate the operation of the wiper motor and actuator assembly 16 and the suction pump 22 such that the suction pump 22 operates only during periods when water is likely to be present at or around the openings 102, for example whilst the wiper blade 14 is being swept across the windscreen 2.

The controller 28 or one or more modules of the controller may also determine whether the ram air source 4 is required by any other systems on the vehicle. For example the controller 28 may determine whether ram air is required to provide enhanced induction for an engine of the vehicle. If the ram air source 4 is required by another system on the vehicle, the suction pump 22 may not be operated by the controller 28.

Additionally or alternatively, if the ram air source 4 is required by another system on the vehicle, the controller 28 or one or more modules of the controller may operate a separate mechanical or electric pump to provide a source of pressurised air for the suction pump 22. Alternatively, if the suction pump 22 comprises a mechanically or electrically powered pump capable of pumping the air within the conduit 18, the controller 28 or one or more modules of the controller may operate this pump in preference to the suction pump powered by the ram air.

The wiper assembly 10 may further comprise a water sensor 30 and/or a dirt sensor 32. In the illustrated example, the water sensor 30 and the dirt sensor 32 are operatively connected to the controller 28. The controller 28 or one or more modules of the controller 28 may consider sensor readings from the water sensor 30 and/or the dirt sensor 32 when determining how to coordinate the operation of the wiper motor and actuator assembly 16 and the suction pump 22. For example, if a high level of water is detected, the controller 28 or one or more modules of the controller may extend the duration over which the suction pump 22 is operating.

Although the invention has been described with reference to a vehicle windscreen, it is equally envisaged that the invention could be applied to a tailgate window, headlight lens, wing mirror, or any other surface of a vehicle from which is it desirable to remove water and/or dirt and/or grease.

Additional Statements of Invention

Statement 1. A wiper assembly for a window of a vehicle, the assembly comprising:
 a wiper blade having a fluid extraction opening;
 a fluid discharge outlet remote from the wiper blade; and
 a fluid tight conduit connecting the fluid extraction opening to the fluid discharge outlet, the fluid tight conduit configured to carry water away from the fluid extraction opening, thereby reducing the amount of water left on the window following wiping and improving visibility for a driver of the vehicle.

Statement 2. The wiper assembly according to statement Statement 1 further comprising a pump configured to draw air and water into the fluid extraction opening and through the fluid tight conduit of the wiper assembly.

Statement 3. The wiper assembly according to statement 1 or 2 further comprising a water/air separator provided upstream of the fluid discharge outlet.

Statement 4. The wiper assembly according to any of the preceding statements, wherein the fluid extraction opening comprises an elongate slot extending along a length of the wiper blade.

Statement 5. The wiper assembly according to any of the preceding statements, wherein the wiper blade comprises one or more internal channels in fluidic communication with the extraction opening and configured to connect the extraction opening to the fluid tight conduit.

Statement 6. The wiper assembly according to any of the preceding statements further comprising one or more additional extraction openings.

Statement 7. The wiper assembly according to statement 5 further comprising one or more additional extraction openings, wherein each of the one or more internal channels is in fluidic communication with a different one of the extraction openings or a different subset of the extraction openings to the others of the one or more channels.

Statement 8. The wiper assembly according to statement 2 or any of statements 3 to 7 when depending upon statement 2, wherein the suction pump is powered by a supply of ram air provided on the vehicle.

Statement 9. The wiper assembly according to any of the preceding statements, wherein the fluid tight conduit comprises a flexible tube.

Statement 10. The wiper assembly according to any of the preceding statements, wherein the wiper blade comprises a leading surface and a trailing surface.

Statement 11. The wiper assembly according to statement 10, wherein the leading and/or trailing surface of the wiper blade comprises one or more serrations.

Statement 12. The wiper assembly according to statement 11, wherein at least one of the one or more serrations is substantially aligned with the fluid extraction opening.

Statement 13. The wiper assembly according to any of the preceding statements further comprising a water sensor, and/or a dirt sensor configured to measure the amount of water and/or dirt present on the surface being wiped.

Statement 14. The wiper assembly according to any of the preceding statements when depending upon statement 2, wherein the wiper assembly further comprises a control module configured to coordinate the operation of the suction pump with the operation of an actuation unit, the actuation unit configured to control the motion of the wiper blade.

Statement 15. The wiper assembly according to statement 14, wherein the wiper assembly further comprises a second control module configured to monitor the presence of water and/or dirt on the vehicle window, and adjusting the operation of the suction pump accordingly.

Statement 16. A controller comprising one or more control modules suitable for use in the wiper assembly according to statement 14 or 15.

Statement 17. A method for removing water from a window of a vehicle, the method comprising:
 providing a wiper blade comprising a fluid extraction opening; and
 a fluid discharge outlet remote from the wiper blade; and
 connecting the fluid extraction opening to the fluid discharge outlet with a fluid tight conduit.

Statement 18. The method according to statement 17 further comprising:
 providing a suction pump configured to draw air and water through the fluid extraction opening of the wiper blade.

Statement 19. The method according to statement 18 further comprising:
 coordinating the operation of the suction pump with the operation of an actuation unit configured to control the motion of the wiper blade.

Statement 20. The method according to statement 18 or 19 further comprising monitoring the presence of water and/or dirt on the vehicle window, and adjusting the operation of the suction pump accordingly.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. Apparatus for cleaning a window of a vehicle, the apparatus comprising:
   a fluid extraction opening provided on a wiper blade, wherein the wiper blade is mounted on the vehicle and engages the window;
   one or more channels provided within and extending along a full length of the wiper blade, wherein the fluid extraction opening is in fluidic communication with the one or more channels;
   a suction pump mounted on the vehicle; and
   a fluid tight conduit extending between the fluid extraction opening and the suction pump.

2. The apparatus of claim 1, wherein the suction pump is air powered.

3. The apparatus of claim 2 wherein the suction pump comprises a venturi duct through which air flows; and
   wherein an outlet of the fluid tight conduit is in fluidic communication with the flow of air at a throat of the venturi duct.

4. The apparatus of claim 2 wherein the suction pump comprises:
   a first piston configured to be acted upon by pressurised air; and
   a second piston configured to act upon the flow within the fluid tight conduit; wherein
   the first piston and the second piston are mechanically coupled.

5. The apparatus of claim 3, wherein the air is ram air provided by a ram air source of the vehicle.

6. The apparatus of claim 5, wherein the air is bled from a ram air system configured to provide ram air to another system of the vehicle.

7. The apparatus of claim 6, wherein the air is bled from an enhanced induction system for an engine of the vehicle.

8. The apparatus of claim 5 wherein the apparatus further comprises:
   a controller, wherein the controller comprises one or more modules configured to determine whether the ram air source is demanded by another system of the vehicle.

9. A vehicle comprising the apparatus according to claim 1.

10. A vehicle comprising the apparatus according to claim 8.

* * * * *